(12) United States Patent  
Harada et al.

(10) Patent No.: US 8,151,284 B2  
(45) Date of Patent: Apr. 3, 2012

(54) DISC APPARATUS FOR RECORDING AND/OR REPRODUCING INFORMATION FOR USE WITH A LARGE DIAMETER DISC WHICH PREVENTS USE WITH A SMALL DIAMETER DISC

(75) Inventors: Kenichi Harada, Tokyo (JP); Naoki Morikawa, Tokyo (JP)

(73) Assignee: Sony Corporation (JP)

( * ) Notice: Subject to any disclaimer, the term of this patent is extended or adjusted under 35 U.S.C. 154(b) by 28 days.

(21) Appl. No.: 12/803,493

(22) Filed: Jun. 29, 2010

(65) Prior Publication Data

US 2011/0010730 A1    Jan. 13, 2011

(30) Foreign Application Priority Data

Jul. 7, 2009    (JP) ................ P2009-160615

(51) Int. Cl.  
*G11B 17/04* (2006.01)

(52) U.S. Cl. ................... 720/623; 720/626

(58) Field of Classification Search ......... 720/617, 720/619–623, 626, 703, 704  
See application file for complete search history.

(56) References Cited

U.S. PATENT DOCUMENTS

| 5,136,570 | A  | * | 8/1992  | Takai et al. ........... 720/624 |
| 7,290,269 | B2 | * | 10/2007 | Hirano et al. ......... 720/602 |
| 7,908,613 | B2 | * | 3/2011  | Yamanaka ............. 720/624 |
| 2006/0242658 | A1 | * | 10/2006 | Yoshimura et al. .... 720/622 |

FOREIGN PATENT DOCUMENTS

JP    11-149688 A    6/1999

* cited by examiner

*Primary Examiner* — Brian Miller  
(74) *Attorney, Agent, or Firm* — Lerner, David, Littenberg, Krumholz & Mentlik, LLP

(57) ABSTRACT

A disc apparatus includes: a housing; a recording/reproducing unit provided in the housing for recording and/or reproducing information in and/or from a disc-shaped recording medium; an insertion/ejection port provided on the housing through which the disc-shaped recording medium is inserted and ejected, the insertion/ejection port having a width greater than the diameter of the disc-shaped recording medium; a disc transport mechanism provided in the housing to transport the disc-shaped recording medium between the insertion/ejection port and the recording/reproducing unit; and an identification mechanism to identify the disc-shaped recording medium as a first disc-shaped recording medium having a first diameter or a second disc-shaped recording medium having a diameter smaller than the first diameter The identification mechanism includes a pair of levers, a pair of gear members, urging means, a stopper, first detection means, and control means.

6 Claims, 16 Drawing Sheets

DISC APPARATUS FOR RECORDING AND/OR REPRODUCING INFORMATION FOR USE WITH A LARGE DIAMETER DISC WHICH PREVENTS USE WITH A SMALL DIAMETER DISC

CROSS-REFERENCE TO RELATED APPLICATION

The present application claims priority from Japanese Patent Application No. JP 2009-160615 filed in the Japanese Patent Office on Jul. 7, 2009, the entire content of which is incorporated herein by reference.

BACKGROUND OF THE INVENTION

1. Field of the Invention

The present invention relates to a disc apparatus for recording and/or reproducing information in and/or from a disc-shaped recording medium.

2. Description of the Related Art

Disc type recording media such as CDs (compact discs) available in the related art include discs having a diameter of 12 cm (hereinafter referred to as "large-diameter discs") and disks having a diameter of 8 cm (hereinafter referred to as "small-diameter discs").

Some of the disc apparatus for recording and/or reproducing information in and/or from disc-shaped recording media can be used for only large-diameter discs.

With regard to the disc apparatus used for only large-diameter discs thus described, the following problem may occur in so-called slot-in type disc apparatus which have a slit-like insertion/ejection port provided on a housing to allow a disc-shaped recording medium to be inserted and ejected through the insertion/ejection port.

Specifically, when a small-diameter disc is inserted through the insertion/ejection port by mistake, the small-diameter disc cannot be ejected from the housing, which can result in a failure of the disc apparatus or damage to the small-diameter disk.

A disc transport device provided to cope with such a situation includes a stopper provided such that it can be projected into a transport path of a disc-shaped recording medium and retracted from the path (see JP-A-11-149688 (Patent Document 1)).

When a small-diameter disc is about to be inserted into an insertion/ejection port as described above, the disc transport device projects the stopper into the transport path of the disc to prevent the insertion of the small-diameter disk. When a large-diameter disc is about to be inserted into the insertion/ejection port, the stopper is retracted from the transport path to allow the insertion of the large-diameter disk.

SUMMARY OF THE INVENTION

The use of the above-described device according to the related art may result in damage to a small-diameter disc or a failure of the stopper when the small-diameter disc is forcibly pushed into the insertion/ejection port while the disc abuts on the stopper.

Thus, it is desirable to provide a disc apparatus in which the insertion of a disc-shaped recording medium having a small diameter can be reliably prevented while preventing damage to the disc-shaped recording medium and a failure of the disc apparatus.

According to an embodiment of the invention, there is provided a disc apparatus including a housing, a recording/reproducing unit provided in the housing to record and/or reproduce information in and/or from a disc-shaped recording medium, an insertion/ejection port provided on the housing through which the disc-shaped recording medium is inserted and ejected, the insertion/ejection port having a width greater than the diameter of the disc-shaped recording medium, a disc transport mechanism provided in the housing to transport the disc-shaped recording medium between the insertion/ejection port and the recording/reproducing unit, and an identification mechanism to identify the disc-shaped recording medium as a first disc-shaped recording medium having a first diameter or a second disc-shaped recording medium having a diameter smaller than the first diameter. The identification mechanism includes a pair of levers provided inside the housing and on both sides of the insertion/ejection port in the width direction thereof. The levers swing at a first swing angle outwardly in the radial direction of the first disc-shaped recording medium from initial positions in which they abut on an outer circumference of the first disc-shaped recording medium when the first recording medium is inserted. The levers are each formed with a lever-side engaging part. The identification mechanism also includes a pair of gear members rotatably supported between the pair of levers and each formed with a gear-member-side engaging part engageable with respective one of the lever-side engaging parts to engage the levers and the gear members with each other, urging means for urging the pair of levers toward the initial positions, a stopper abutting on the pair of levers to determine the initial positions, first detection means for detecting when the angle of rotation of one of the pair of levers has reached a first angle of rotation, and control means for controlling the disc transport mechanism based on the detecting operation of the first detection means. The lever-side engaging parts and the gear-member-side engaging parts are engaged with each other in the initial positions and configured such that the gear members are rotated as a result of the swing of the levers and such that the gear-member-side engaging parts and the lever-side engaging parts are disengaged as a result of the rotation of the gear members to stop the rotation of the gear members and the swing of the levers. The control means causes the disc transport mechanism to transport the disc-shaped recording medium to the recording/reproducing unit when it is determined by the first detection means that the angle of rotation of the one of the levers has reached the first angle and causes the disc transport mechanism to eject the disc-shaped recording medium from the insertion/ejection port when it is determined by the first detection means that the angle of rotation of the one of the levers does not reach the first angle.

According to the embodiment of the invention, the angle of rotation of one of the levers is detected to identify a disc-shaped recording medium as a first disc-shaped recording medium having a first diameter or a second disc-shaped recording medium having a diameter smaller than the first diameter.

A second disc-shaped recording medium is ejected from the insertion/ejection port by the disc transport mechanism.

Therefore, the insertion of a disc-shaped recording medium having a diameter smaller than the first diameter can be reliably prevented while preventing damage to the disc-shaped recording medium or a failure of the disc apparatus.

DESCRIPTION OF PREFERRED EMBODIMENTS

An embodiment of the invention will now be described with reference to FIGS. 1 to 16.

The present embodiment described below is a disc apparatus 10 which is an on-vehicle CD player to be used with a disc-shaped recording medium 2 which is a compact disc having audio signals recorded therein.

Figure 1:
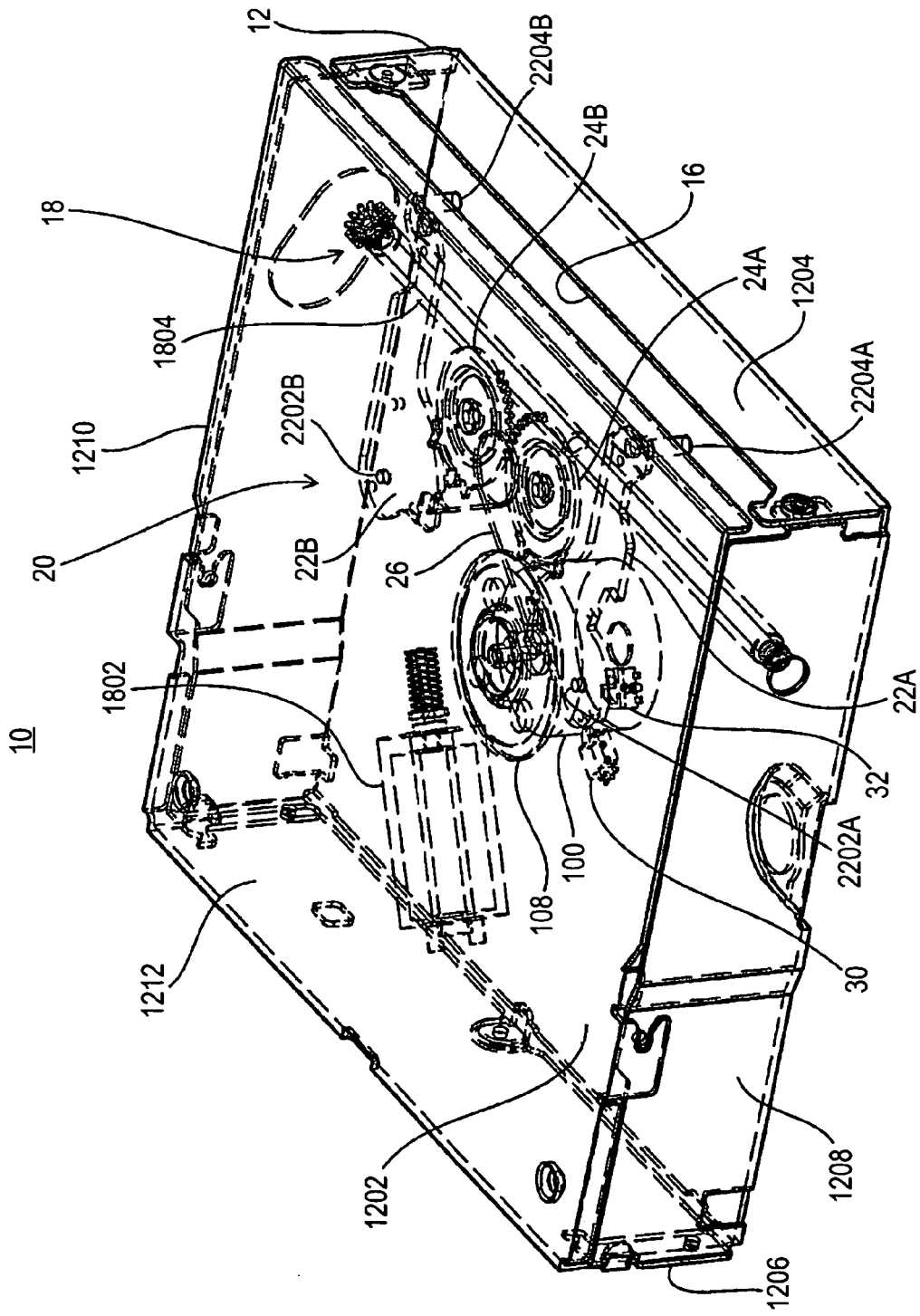
FIG. 1 is a perspective view of a disc apparatus according to an embodiment of the invention.
Figure 2:
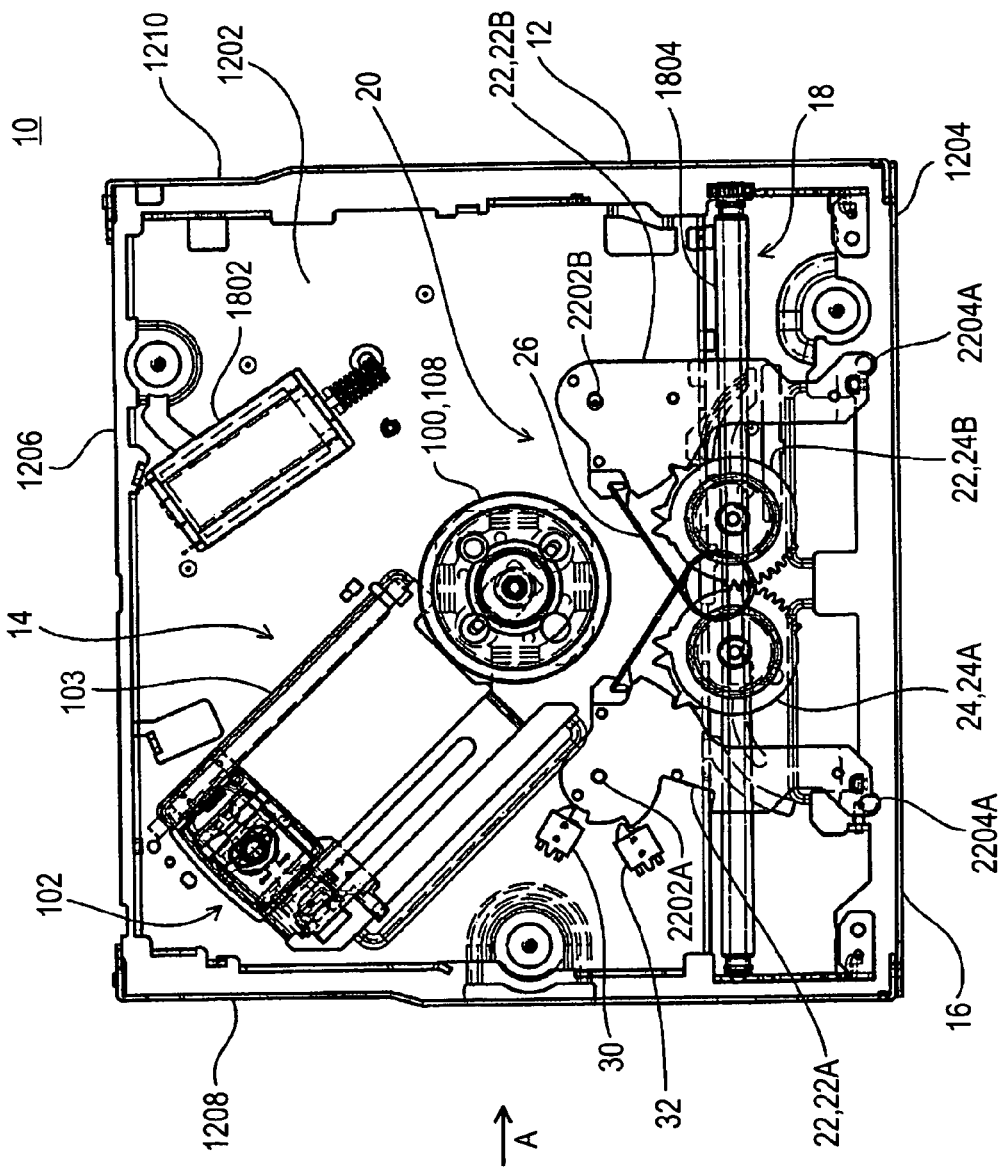
FIG. 2 is a plan view of the disc apparatus according to the embodiment.
Figure 3:
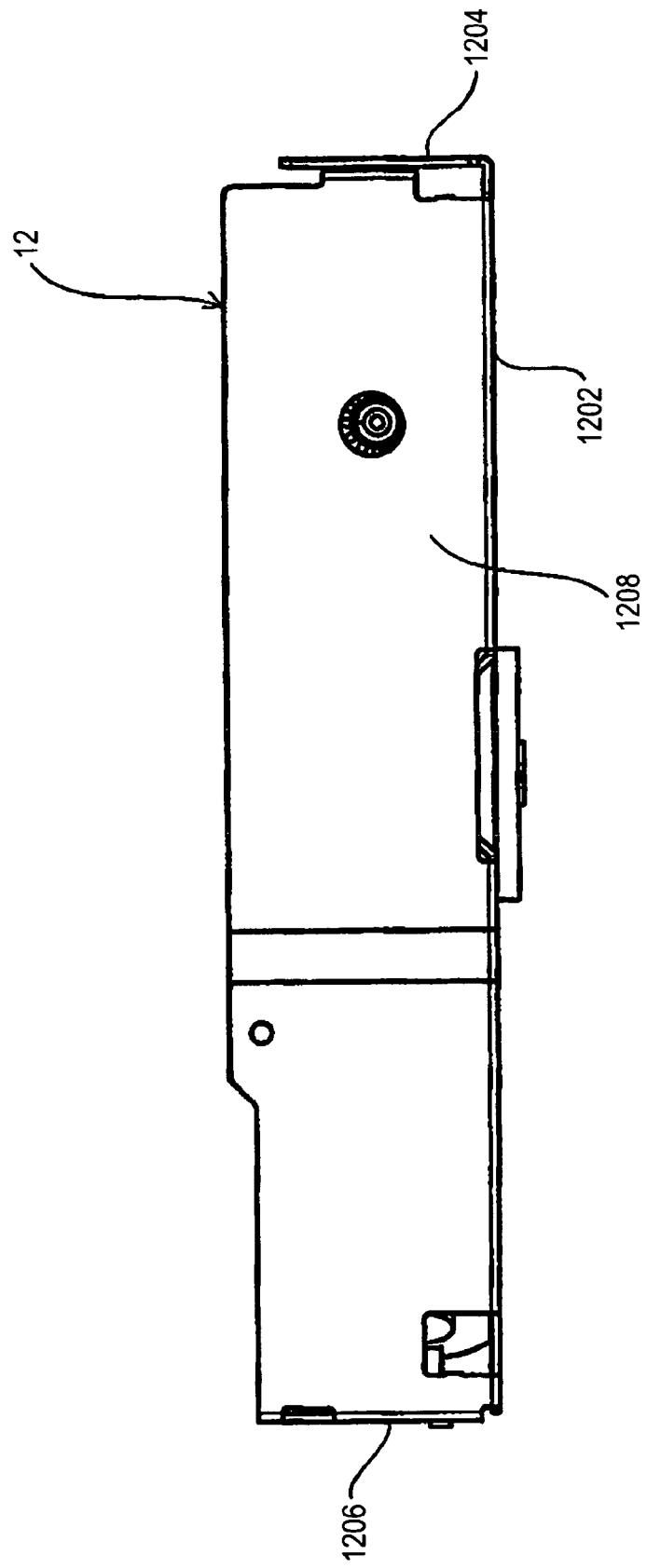
FIG. 3 is a view of the disc apparatus taken in the direction indicated by the arrow A in FIG. 2, showing the apparatus with a top plate thereof removed.

As shown in FIGS. 1 to 3, the disc apparatus 10 includes a housing 12, a recording/reproducing unit 14, an insertion/ejection port 16, a disc transport mechanism 18, and an identification mechanism 20.

As shown in FIGS. 1 to 3, the housing 12 is in the form of, for example, a flat rectangular plate, and the housing has a width and a length greater than the height of the same.

The housing 12 has a rectangular bottom plate 1202, a front plate 1204 erected at a front edge of the bottom plate 1202, a rear plate 1206 erected at a rear edge of the bottom plate 1202, and a left side plate 1208 and a right side plate 1210 erected at left and right side edges of the bottom plate 1202, respectively. The housing 12 also has a top plate 1212 connecting top parts of the front plate 1204, the rear plate 1206, and the side plates 1208 and 1210.

The recording/reproducing unit 14, which is provided in the housing 12, records and/or reproduces information in and/or from a disc-shaped recording medium 2. In the present embodiment, the recording/reproducing unit 14 reproduces audio signals recorded in the disc-shaped recording medium 2.

Figure 4:
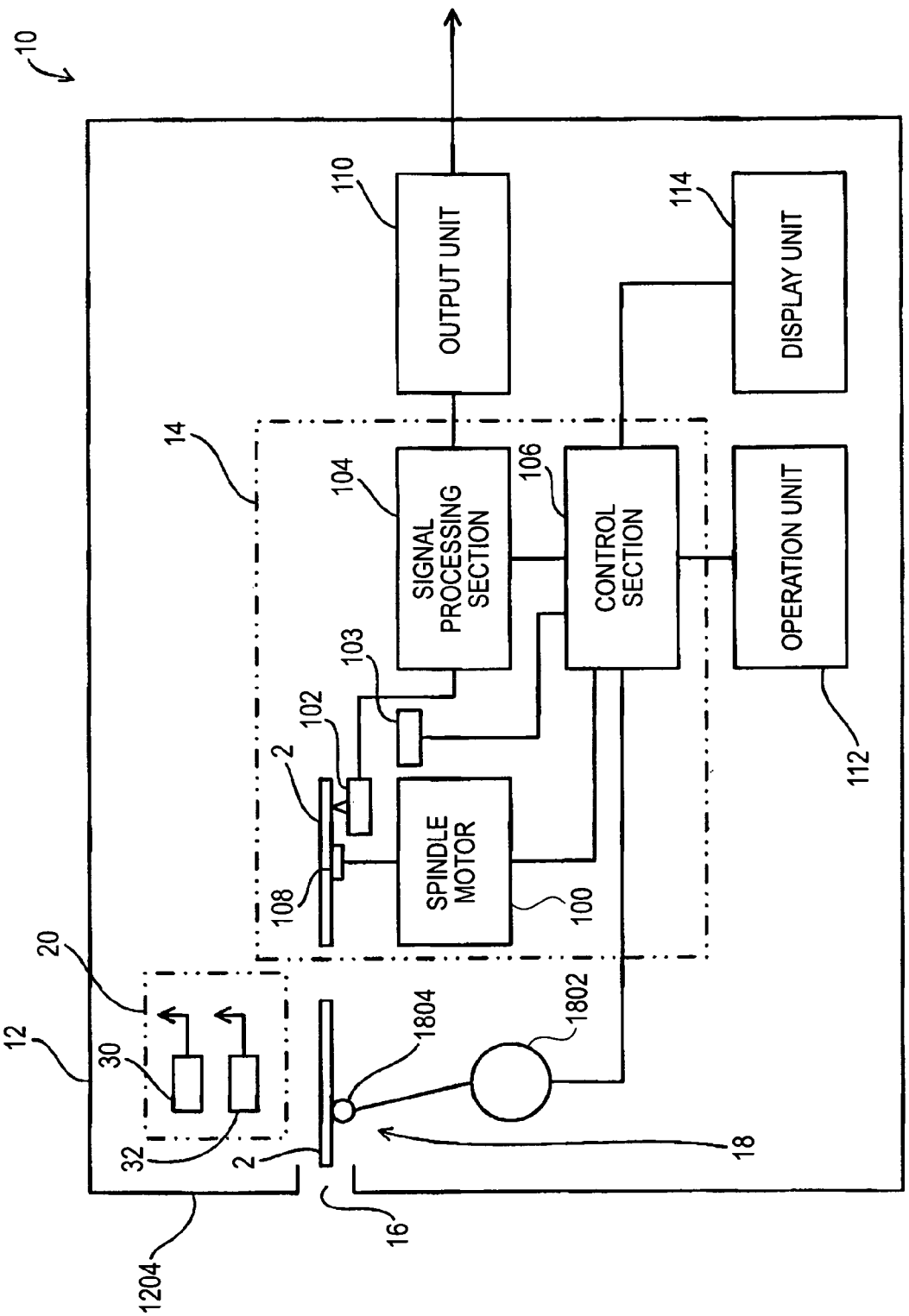
FIG. 4 is a block diagram showing a configuration of a control system of the disc apparatus according to the embodiment.

The recording/reproducing unit 14 includes a spindle motor 100, an optical pickup 102, a signal processing section 104 (FIG. 4), and a control section 106 (FIG. 4).

As shown in FIG. 4, the spindle motor 100 rotates the disc-shaped recording medium 2, and the motor includes a turntable 108 on which the disc-shaped recording medium 2 is placed.

The optical pickup 102 projects an optical beam on a recording surface of the disc-shaped recording medium 2 rotated by the spindle motor 100 and detects a reflected optical beam from the recording surface. Thus, information recorded on the recording surface is reproduced to obtain a reproduction signal.

As shown in FIG. 2, the optical pickup 102 is moved by a moving mechanism 103 in the radial direction (tracking direction) of the disc-shaped recording medium 2.

As shown in FIG. 4, the signal processing section 104 performs various processes on a reproduction signal supplied from the optical pickup 102 to generate an audio signal from the reproduction signal.

The control section 106 controls the rotation of the spindle motor 100 and controls the movement of the optical pickup 102 caused by the moving mechanism 103.

The control section 106 also controls the rotation of a transport motor 1802 which will be described later.

In FIG. 4, reference numeral 110 represents an output unit for amplifying an audio signal output from the signal processing section 104 and outputting the signal to an external speaker.

Reference numeral 112 represents an operation unit for accepting various operations associated with the reproduction of the disc-shaped recording medium 2 performed by the recording/reproducing unit 14.

Reference numeral 114 represents a display unit for displaying states of operation of the recording/reproducing unit 14 and the contents of operations performed at the operation unit 112.

As shown in FIGS. 1 and 2, the insertion/ejection port 16 is provided on the front plate 1204 of the housing 12 to allow the disc-shaped recording medium 2 to be inserted and ejected to and from the apparatus, and the port has a width greater than the diameter of the disc-shaped recording medium 2.

As shown in FIGS. 1 and 4, the disc transport mechanism 18 transports the disc-shaped recording medium 2 between the insertion/ejection port 16 and the recording/reproducing unit 14.

The disc transport mechanism 18 performs linear transportation and upward/downward transportation of the disc-shaped recording medium 2.

The linear transportation is to move the disc-shaped recording medium 2 linearly in the direction of moving away from or toward the insertion/ejection port 16. Such transportation enables an operation of pulling the disc-shaped recording medium 2 into the apparatus through the insertion/ejection port 16 or an operation of ejecting the disc-shaped recording medium 2 through the insertion/ejection port 16.

The upward/downward transportation is to move the disc-shaped recording medium up and down above the recording/reproducing unit 14.

As shown in FIGS. 1 and 2, the disc transport mechanism 18 includes a transport motor 1802, a transport roller 1804, and a driving force transmission mechanism which is not shown.

The driving motor 1802 is rotated in forward and reverse directions under control exercised by the control section 106.

The transport roller 1804 resides near the insertion/ejection port 16 and extends parallel to the extending direction of the insertion/ejection port 16. The roller 1804 is rotatably supported at both ends thereof by a transport roller supporting mechanism which is not shown.

The transport roller supporting mechanism moves the transport roller 1804 up and down into a transporting position and a retracted position which is lower than the transporting position.

The transporting position is a position in which an outer circumferential surface of the transport roller 1804 contacts a bottom surface of the disc-shaped recording medium (a surface of the medium facing toward the optical pickup 102). The retracted position is a position below the disc-shaped recording medium 2 in which the outer circumferential surface of the transport roller 1804 is spaced from the medium.

The outer circumferential surface of the transport roller 1804 is formed using an elastic material which is softer than the disc-shaped recording medium 2 and which has a high frictional coefficient such that the disc-shaped recording medium 2 can be reliability transported without damaging the bottom surface of the medium. Various materials known in the related art such as rubber may be used as the material described above.

The transport roller 1804 is rotated forward and reverse directions with a driving force of the driving motor 1802 supplied via the driving force transmission mechanism.

The transport roller 1804 transports the disc-shaped recording medium 2 inserted in the insertion/ejection port 16 from the insertion/ejection port 16 to the recording/reproducing unit 14 by rotating in the forward direction in the transporting position with the outer circumferential surface in contact with the bottom surface of the disc-shaped recording medium 2 inserted in the insertion/ejection port 16.

The transport roller 1804 transports the disc-shaped recording medium 2 from the recording/reproducing unit 14 to the insertion/ejection port 16 to eject the medium from the insertion/ejection port 16 by rotating in the reverse direction in the transporting position with the outer circumferential surface in contact with the bottom surface of the disc-shaped recording medium 2.

When the disc-shaped recording medium 2 is transported by the disc transport mechanism 18 from the insertion/ejection port 16 to the recording/reproducing unit 14 and placed on the turntable 108, a chucking mechanism (not shown) is lowered toward the turntable 108 from above to press the disc-shaped recording medium 2 against the turntable. In other words, the disc-shaped recording medium 2 is chucked by the chucking mechanism.

At this time, in conjunction with the lowering of the chucking mechanism, the transport roller 1804 is lowered from the transporting position to the retracted position, and the outer circumferential surface of the transport roller 1804 is moved away from the bottom surface of the disc-shaped recording medium 2.

Thus, the disc-shaped recording medium 2 is rotated integrally with the turntable 108, and the apparatus is enabled for reproduction of signals using the optical pickup 102.

When signal reproduction is finished, the disc-shaped recording medium 2 is removed from the recording/reproducing unit 14 to take it out through the insertion/ejection port 16 by elevating the chucking mechanism to allow the transportation of the disk-shaped recording medium 2.

At this time, on conjunction with the elevation of the chucking mechanism, the transport roller 1804 is elevated from the retracted position to the transporting position, and the outer circumferential surface of the transport roller 1804 comes into contact with the bottom surface of the disc-shaped recording medium 2.

Next, the disc-shaped recording medium 2 is transported by the disc transport mechanism 18 from the recording/reproducing unit 14 to the insertion/ejection port 16. Thus, the medium can be taken out of the housing 2 from outside.

The above-described disc transport mechanism 18 and the chucking mechanism may employ various configurations known in the related art.

The identification mechanism 20 identifies a disc-shaped recording medium 2 inserted into the insertion/ejection port 16 or identifies the medium as a first disc-shaped recording medium 2A having a first diameter or a second disc-shaped recording medium 2B having a diameter smaller than the first diameter.

The description of the embodiment will be continued on an assumption that the first diameter of the first disc-shaped recording medium 2A is 12 cm and that the diameter of the second disc-shaped recording medium 2b is 8 cm.

As shown in FIGS. 1, 2, and 5 to 7, the identification mechanism 20 includes a pair of levers 22, a pair of gear members 24, an urging unit 26, a stopper 28, a first detection unit 30, and the control section 106 (control means) described above.

A support plate 36 is disposed in a position near the insertion/ejection port 16 and above the disc-shaped recording medium 2 inserted through the insertion/ejection port 16.

The support plate 36 is disposed in the position near the insertion/ejection port 16 and above the disc-shaped recording medium 2 inserted through the insertion/ejection port 16 such that it extends in parallel with the disc-shaped recording medium 2 in the attitude for the linear transportation. The support plate is supported by the housing 12.

The pair of levers 22, the pair of gear members 24, the urging unit 26, the stopper 28, and the first detection unit 30 are supported by the support plate 36.

The pair of levers 22, the pair of gear members 24, and the first detection unit 30 are disposed side by side such that they do not overlap each other on a plane extending parallel to the disc-shaped recording medium 2 inserted through the insertion/ejection port 16.

The pair of levers 22 is disposed in positions which are symmetric about an imaginary line extending through the widthwise center of the insertion/ejection port 16 and extending in the direction in which the disc-shaped recording medium 2 is transported into and out the housing.

Specifically, the pair of levers 22 is constituted by a first lever 22A and a second lever 22B.

Figure 5:
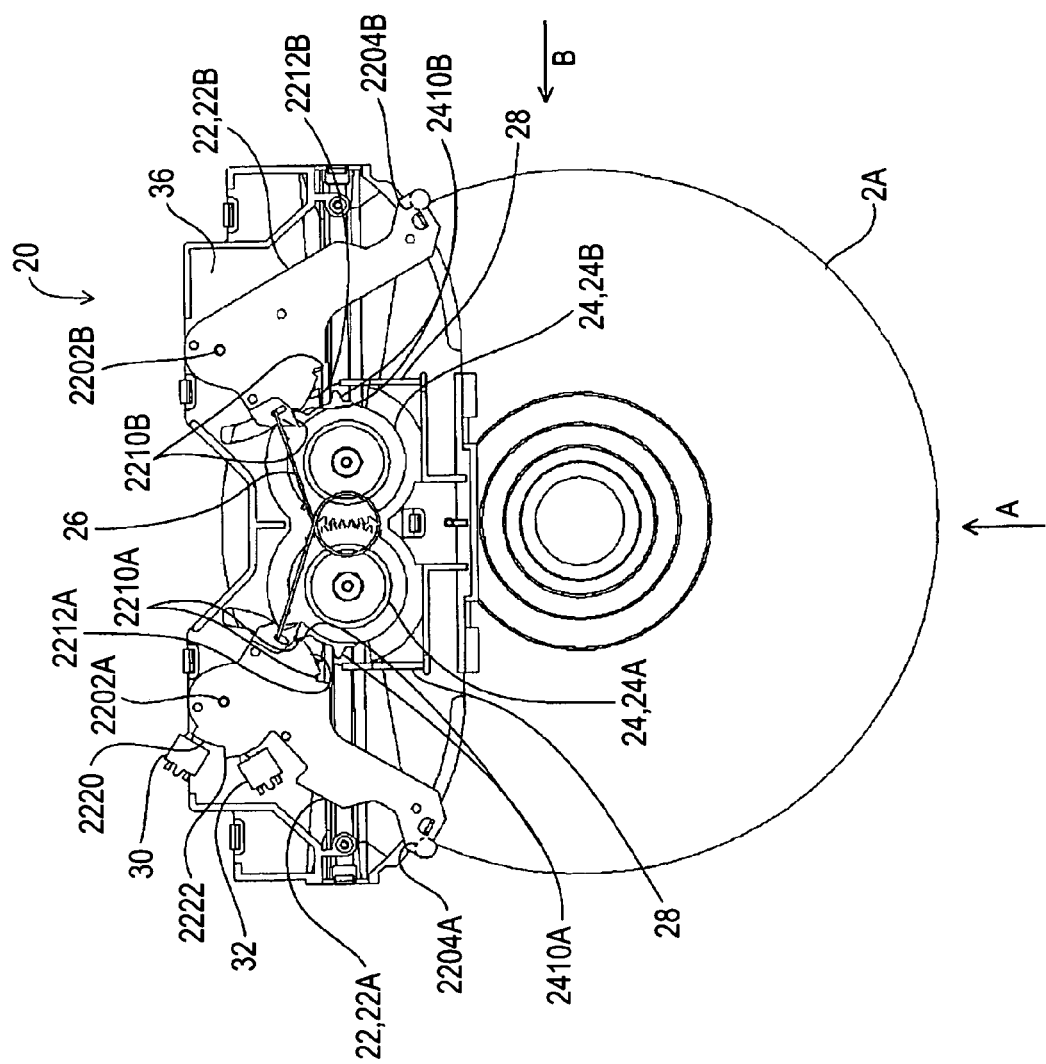
FIG. 5 is a plan view of the disc apparatus showing a state in which an outer circumference of a first disc-shaped recording medium abuts on a pin of a first lever and a pin of a second lever.
Figure 6:
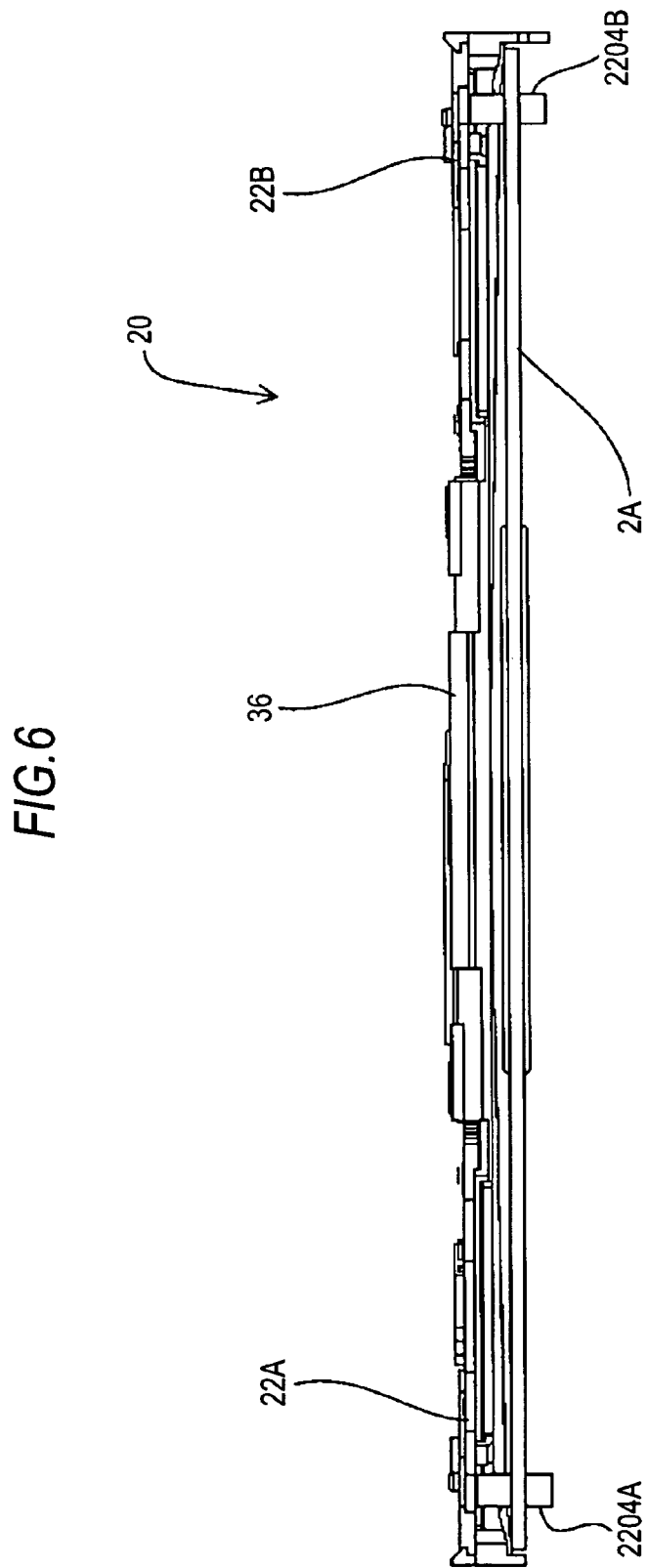
FIG. 6 is a view taken in the direction indicated by the arrow A in FIG. 5.

As shown in FIGS. 5 and 6, the first lever 22A is provided on the support plate 36 and located on one side of the insertion/ejection port 16 when viewed in the width direction thereof.

The first lever 22A is supported on the support plate 36 at a base portion thereof such that the lever can swing about a shaft 2202A. A tip portion of the first lever 22A protrudes forward beyond a front edge of the support plate 36, and a pin 2204A protrudes downward from the tip portion.

In an initial position of the first lever 22A, the pin 2204A abuts on an outer circumference of a first disc-shaped recording medium 2A when the medium is inserted into the insertion/ejection port 16.

When the first disc-shaped recording medium 2A is inserted by a hand of the user, the first lever 22A located on one widthwise side of the insertion/ejection port 16 swings outwardly at a first swing angle in the radial direction of the first disc-shaped recording medium 2A.

A lever-side engaging part is formed at the base portion of the first lever 22A in a position where the base portion faces a base portion of the second lever 22B.

The lever-side engaging part includes a first engaging recess 2210A and a first inclined surface 2212A.

The first engaging recess 2210A is formed such that it can be engaged with a first engaging protrusion 2410A which will be described later.

Figure 14:
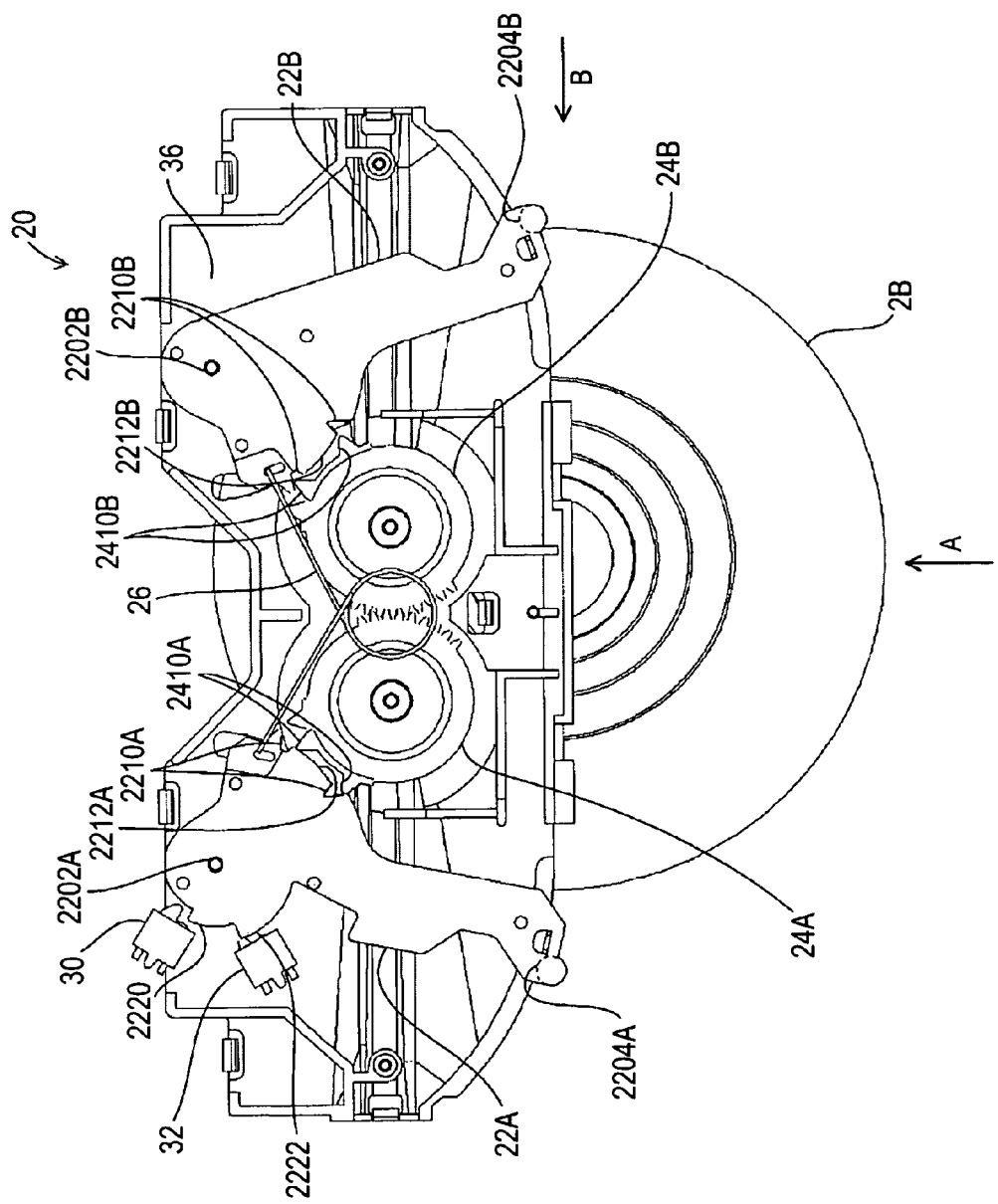
FIG. 14 is a plan view of the disc apparatus showing a state in which the outer circumference of the second disc-shaped recording medium abuts on only the pin of the second lever.

As shown in FIG. 14, the first inclined surface 2212A is formed contiguously with the first engaging recess 2210A such that the first engaging protrusion 2410A is urged in the direction of increasing the distance between the center of the swing of the first lever 22A and the center of the rotation of the first gear member 24A when the protrusion rides on the inclined surface.

Figure 7:
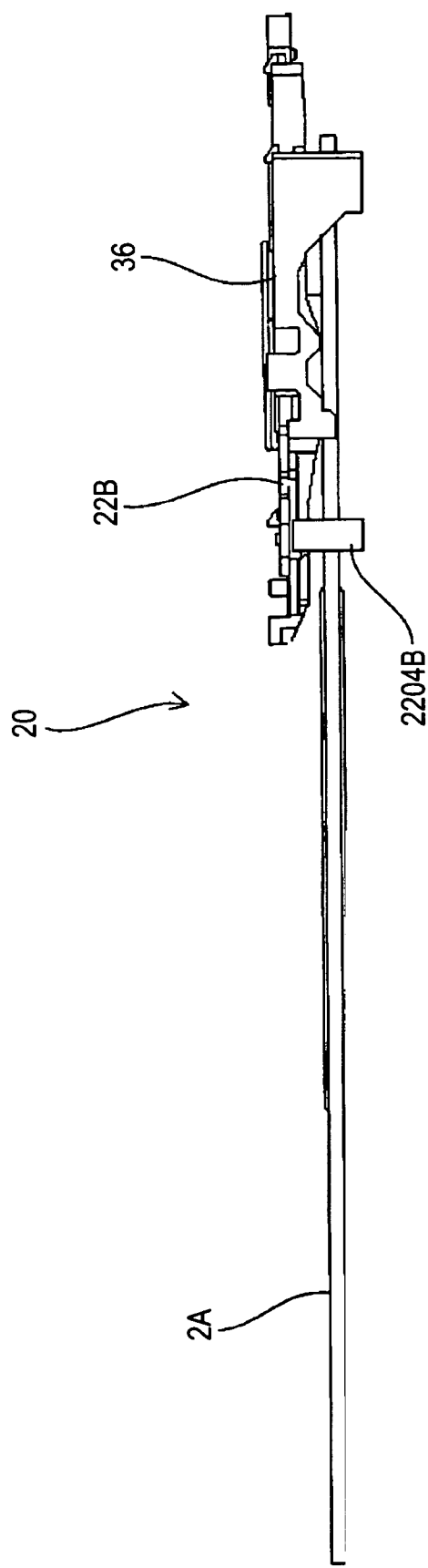
FIG. 7 is a view taken in the direction indicated by the arrow B in FIG. 5.

As shown in FIGS. 5, 6 and 7, the second lever 22B is provided on the support plate 36 and located on the other side of the insertion/ejection port 16 when viewed in the width direction thereof.

The second lever 22B is supported on the support plate 36 at a base portion thereof such that the lever can swing about a shaft 2202B. A tip portion of the second lever 22B protrudes forward beyond the front edge of the support plate 36, and a pin 2204B protrudes downward from the tip portion.

In an initial position of the second lever 22B, the pin 2204B abuts on the outer circumference of the first disc-shaped recording medium 2A when the medium is inserted into the insertion/ejection port 16.

When the first disc-shaped recording medium 2A is inserted, the second lever 22B located on the other widthwise side of the insertion/ejection port 16 swings outwardly at the first swing angle in the radial direction of the first disc-shaped recording medium 2A.

A lever-side engaging part is formed at the base portion of the second lever 22B in a position where the base portion faces the base portion of the first lever 22A.

The lever-side engaging part includes a second engaging recess 2210B and a second inclined surface 2212B.

The second engaging recess 2210B is formed such that it can be engaged with a second engaging protrusion 2410B which will be described later.

Figure 11:
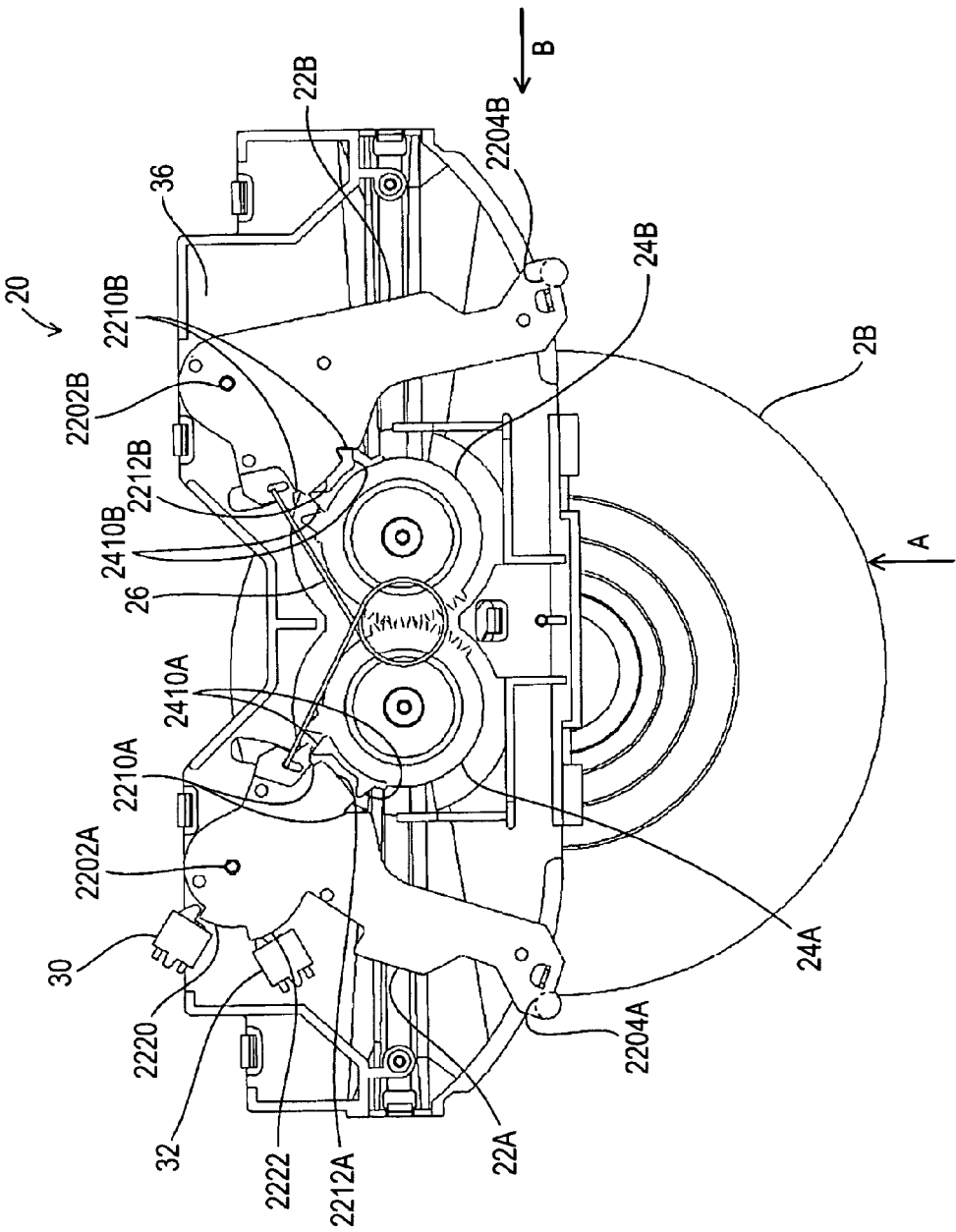
FIG. 11 is a plan view of the disc apparatus showing a state in which the outer circumference of the second disc-shaped recording medium abuts on only the pin of the first lever.

As shown in FIG. 11, the second inclined surface 2212B is formed contiguously with the second engaging recess 2210B such that the second engaging protrusion 2410B is urged in the direction of increasing the distance between the center of the swing of the second lever 22B and the center of the rotation of the second gear member 24B when the protrusion rides on the inclined surface.

The pair of gear members 24 is supported on the support plate 36 such that they can rotate between the pair of levers 22, and the gear members are engaged with each other.

The pair of gear members 24 is disposed in positions which are symmetric about an imaginary line extending through the widthwise center of the insertion/ejection port 16 and extending in the direction in which the disc-shaped recording medium 2 is transported into and out of the housing.

The pair of gear members 24 is constituted by a first gear member 24A and a second gear member 24B.

The first gear member 24A is rotatably supported between the first lever 22A and the second lever 22B and on the side of the first lever 22A.

The first gear member 24A is formed with a first engaging protrusion 2410A to serve as a gear-member-side engaging part.

The second gear member 24B is rotatably supported between the first lever 22A and the second lever 22B and on the side of the second lever 22B.

The second gear member 24B is formed with a second engaging protrusion 2410B to serve as a gear-member-side engaging part.

That is, the lever-side engaging parts and the gear-member-side engaging parts are engaged with each other in their initial positions. The gear members are rotated when the levers swing. The gear-member-side engaging parts and the lever-side engaging parts are disengaged from each other by the rotation of the gear members to stop the rotation of the gear members and the swing of the levers.

More specifically, the first engaging recess 2210A and the first engaging protrusion 2410A are engaged with each other in their initial positions, and the first gear member 24A is rotated when the first lever 22A swings.

The first engaging protrusion 2410A is disengaged from the first engaging recess 2210A as a result of the rotation of the first gear member 24A. Then, the tip of the first engaging protrusion 2410A rides on the first inclined surface 2212A to stop the rotation of the first gear member 24A and the swing of the first lever 22A.

The second engaging recess 2210B and the second engaging protrusion 2410B are engaged with each other in their initial positions, and the second gear member 24B is rotated when the second lever 22B swings.

The second engaging protrusion 2410B is disengaged from the second engaging recess 2210B as a result of the rotation of the second gear member 24B. Then, the tip of the second engaging protrusion 2410B rides on the second inclined surface 2212B to stop the rotation of the second gear member 24B and the swing of the second lever 22B.

As shown in FIG. 5, the urging member 26 urges the pair of levers 22 toward their initial positions.

The urging member 26 of the present embodiment is a spring member stretched between the base sections of the pair of levers 22.

The stopper 28 abuts on the pair of levers 22 to determine the initial positions of the levers 22.

The stopper 28 is a wall formed to bulge from the support plate 36.

The initial positions of the pair of levers 22 are positions as described below.

Specifically, the initial positions are positions in which the pins 2204A and 2204B abut on the outer circumference of the first disc-shaped recording medium 2A inserted in the insertion/ejection port 16 and in which the pair of levers 22 can swing outwardly in the radial direction of the first disc-shaped recording medium 2A as the first disc-shaped recording medium 2A is inserted.

The first detection unit 30 detects when the angle of rotation of one of the pair of levers 22 has reached a first angle. In the present embodiment, the detection unit detects when the angle of rotation of the first lever 22A reaches the first angle.

The present embodiment further includes a second detection unit 32 which detects when the angle of rotation of one of the levers 22 has reached a second angle smaller than the first swing angle.

As shown in FIG. 5, the first detection unit 30 is a limit switch having a contact which is turned on or off when pressed by a first protrusion 2220 provided at the base section of the first lever 22A.

The second detection unit 32 is a limit switch having a contact which is turned on or off when pressed by a second protrusion 2222 provided in a position of the base section of the first lever 22A which is phase-shifted from the position of the first protrusion 2220.

The control section 106 controls the disc transport mechanism 18 based on the detecting operation of the first detection unit 30.

When it is determined that the angle of rotation of one of the levers 22 (first lever 22A) does not reach the first angle as a result of the detection by the first detection unit 30, the control section 106 controls the disc transport mechanism 18 such that the disc-shaped recording medium 16 will be ejected through the insertion/ejection port 16 instead of being further inserted.

In the present embodiment, when it is determined that the angle of rotation of the first lever 22A has reached the second angle as a result of the detection, the control section 106 controls the disc transport mechanism 18 to cause it to start feeding the disc-shaped recording medium 2 inserted in the insertion/ejection port 16 toward the recording/reproducing unit 14.

The control section 106 determines whether the detection by the first detection unit 30 indicates that the angle of rotation of the first lever 22A has reached the first angle within a predetermined period after it was determined that the angle of rotation of the first lever 22A reached the second angle.

When the determination provides a positive result, the disc transport mechanism 18 continues feeding the disc-shaped recording medium 2 to transport the disc-shaped recording medium 2 to the recording/reproducing unit 14.

When the determination provides a negative result, the feeding of the disc-shaped recording medium 2 by the disc transport mechanism 18 is stopped, and the disc transport mechanism 18 is controlled to eject the disc-shaped recording medium 2 inserted in the insertion/ejection port 16 from the insertion/ejection port 16.

Operations of the identification mechanism 20 will now be described in detail.

First, a description will be made with reference to FIGS. 5, 6, and 7 on operations performed by the identification mechanism 20 when the first disc-shaped recording medium 2A is inserted into the insertion/ejection port 16.

When the first disc-shaped recording medium 2A is inserted into the insertion/ejection port 16 with the first lever 22A and the second lever 22B in their initial positions, the pins 2204A and 2204B abut on the outer circumference of the first disc-shaped recording medium 2A.

As a result of the insertion of the first disc-shaped recording medium 2A, the first lever 22A and the second lever 22B are swung outwardly in the radial direction of the first disc-shaped recording medium 2A.

The first gear member 24A is rotated by the swing of the first lever 22A. The second gear member 24B is rotated by the swing of the second lever 22B.

As a result, the first gear member 24A and the second gear member 24B engaged with each other are rotated in opposite directions in synchronism with each other.

When it is determined that the angle of rotation of the first lever 22A has reached the second angle of rotation as a result of detection performed by the second detection unit 32, the control section 106 controls the disc transport mechanism 18 to cause it to start feeding the first disc-shaped recording medium 2A.

As the first disc-shaped recording medium 2A is fed in, the first lever 22A is swung further (FIG. 5). The first detection unit 30 detects when the angle of rotation of the first lever 22A reaches the first angle of rotation.

Then, the control section 106 controls the disc transport mechanism 18 to cause it to continue feeding the first disc-shaped recording medium 2A, whereby the first disc-shaped recording medium 2A is transported to the recording/reproducing unit 14.

The first disc-shaped recording medium 2A transported to the recording/reproducing unit 14 is placed on the turntable 108 and chucked by the chucking mechanism, and an operation of reproducing the information in the first disc-shaped recording medium 2A is performed.

A description will now be made on operations of the identification mechanism 20 performed when the second disc-shaped recording medium 2B having a diameter smaller than that of the first disc-shaped recording medium 2A is inserted into the insertion/ejection port 16.

The second disc-shaped recording medium 2B may be inserted in three different ways. The medium may be inserted into the insertion/ejection port 16 in a position in the middle of the port when viewed in the width direction thereof. The medium may be inserted into the insertion/ejection port 16 in a position offset toward one side of the port when viewed in the width direction thereof. Further, the medium may be inserted into the insertion/ejection port 16 in a position offset toward the other side of the port when viewed in the width direction thereof.

Figure 8:
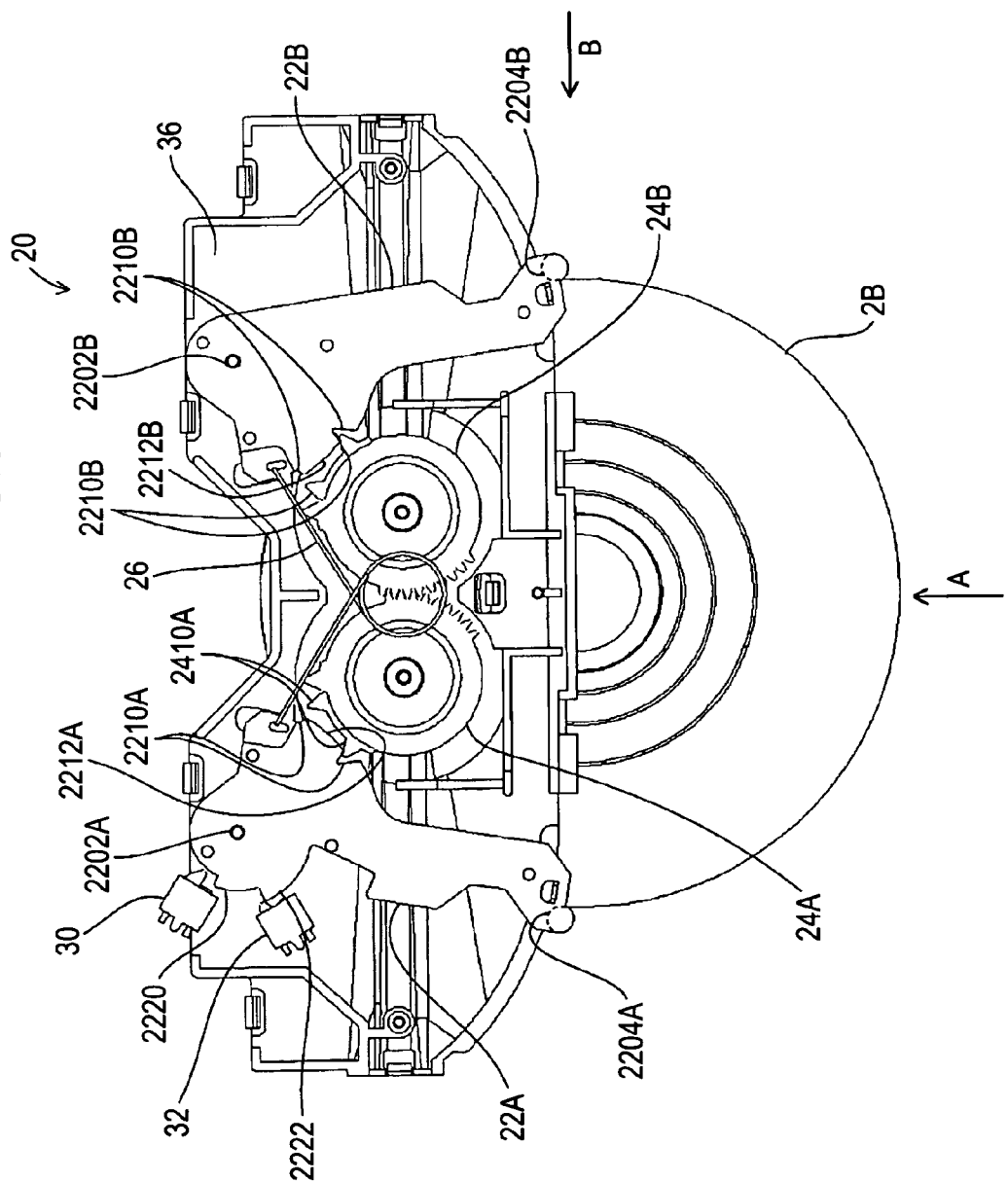
FIG. 8 is a plan view of the disc apparatus showing a state in which an outer circumference of a second disc-shaped recording medium abuts on both of the pin of the first lever and the pin of the second lever.
Figure 9:
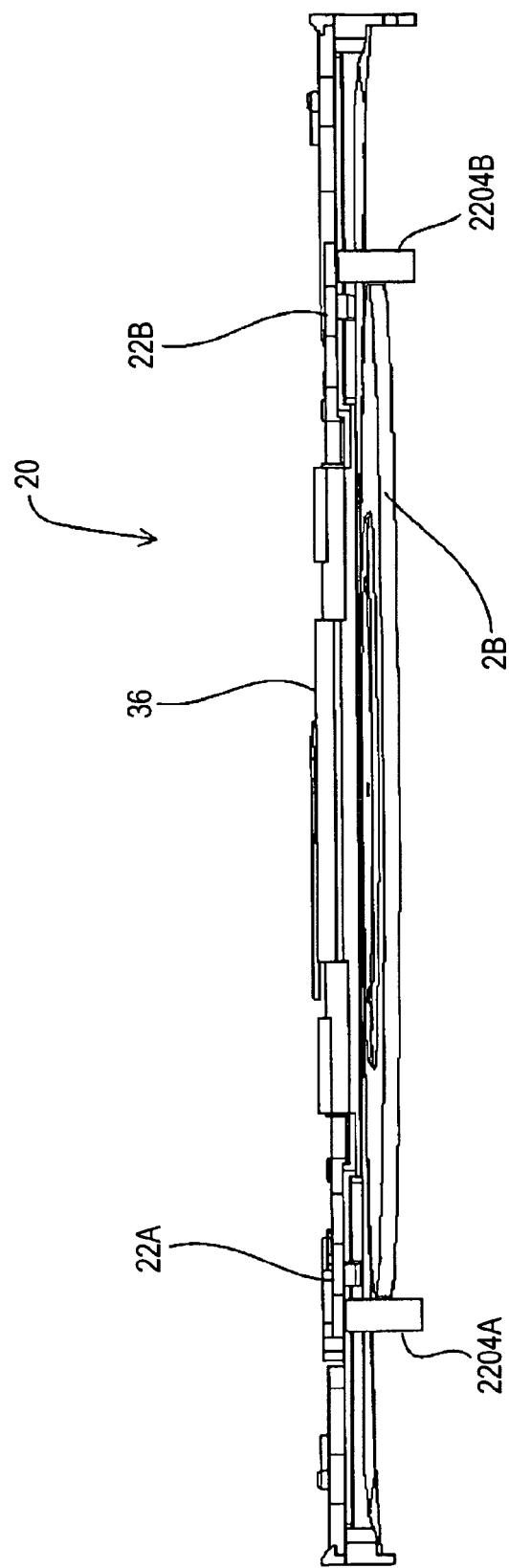
FIG. 9 is a view taken in the direction indicated by the arrow A in FIG. 8.
Figure 10:
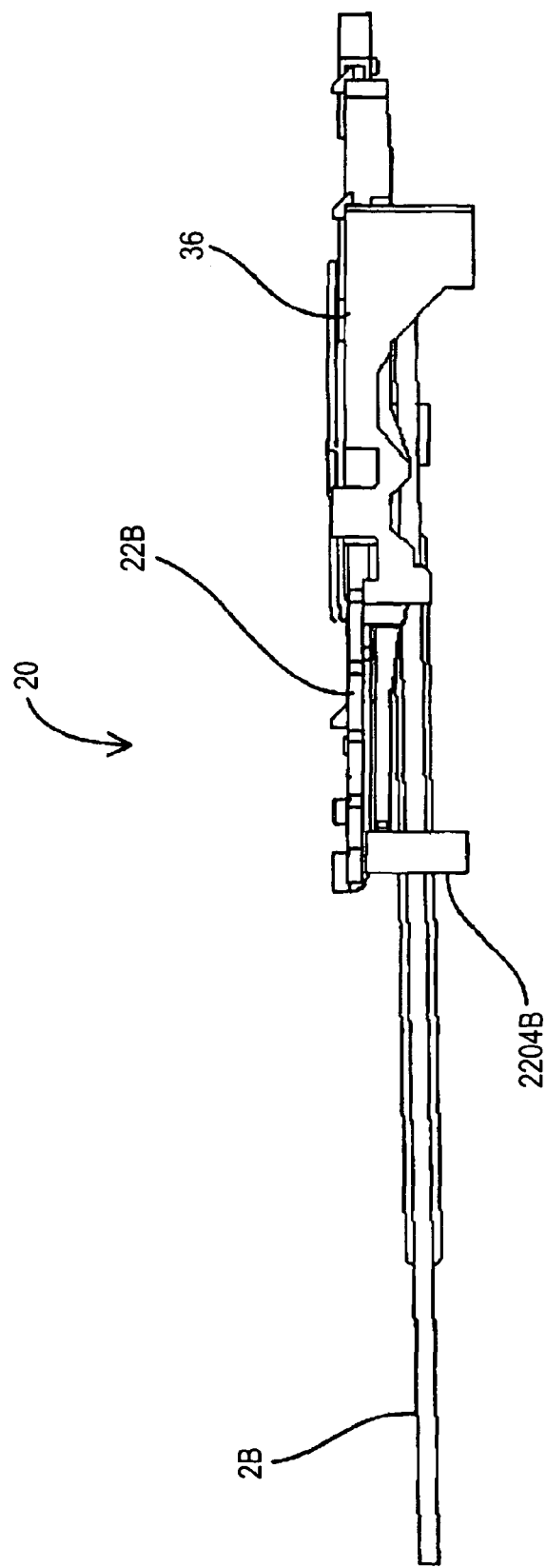
FIG. 10 is a view taken in the direction indicated by the arrow B in FIG. 8.

First, a description will be made with reference to FIGS. 8 to 10 on operations performed when the second disc-shaped recording medium 2B is inserted into the insertion/ejection port 16 in a position in the middle of the port when viewed in the width direction thereof.

When the second disc-shaped recording medium 2B is inserted into the insertion/ejection port 16 in the middle thereof with the first lever 22A and the second lever 22B in their initial positions, both of the pins 2204A and 2204B abut on an outer circumference of the second disc-shaped recording medium 2B.

As a result of the insertion of the second disc-shaped recording medium 2B, the first lever 22A and the second lever 22B are swung outwardly in the radial direction of the second disc-shaped recording medium 2B.

The first gear member 24A is rotated by the swing of the first lever 22A. The second gear member 24B is rotated by the swing of the second lever 22B.

As a result, the first gear member 24A and the second gear member 24B engaged with each other are rotated in opposite directions in synchronism with each other.

When it is determined that the angle of rotation of the first lever 22A has reached the second angle of rotation as a result of detection performed by the second detection unit 32, the control section 106 controls the disc transport mechanism 18 to cause it start feeding the second disc-shaped recording medium 2B.

Although the second disc-shaped recording medium 2B is fed in, since the second disc-shaped recording medium 2B has a diameter smaller than the diameter of the first disc-shaped recording medium 2A, the angle of swing of the first lever 22A does not reach the first angle of rotation.

That is, it is not determined according to the detection by the first detection unit 30 that the angle of rotation of the first lever 22A has reached the first angle of rotation within the predetermined period after it was determined that the angle of rotation of the first lever 22A reached the second angle of rotation.

Therefore, the control section 106 controls the disc transport mechanism 18 to stop the feed of the second disc-shaped recording medium 2B and to eject the second disc-shaped recording medium 2B from the insertion/ejection port 16.

Figure 12:
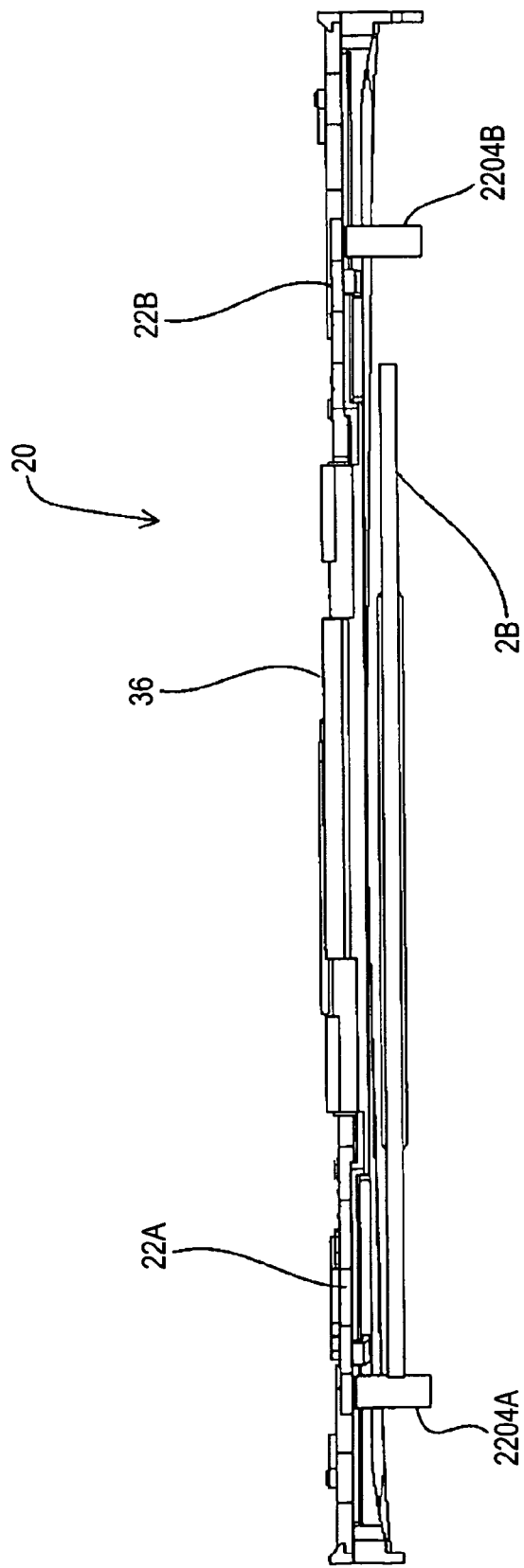
FIG. 12 is a view taken in the direction indicated by the arrow A in FIG. 11.
Figure 13:
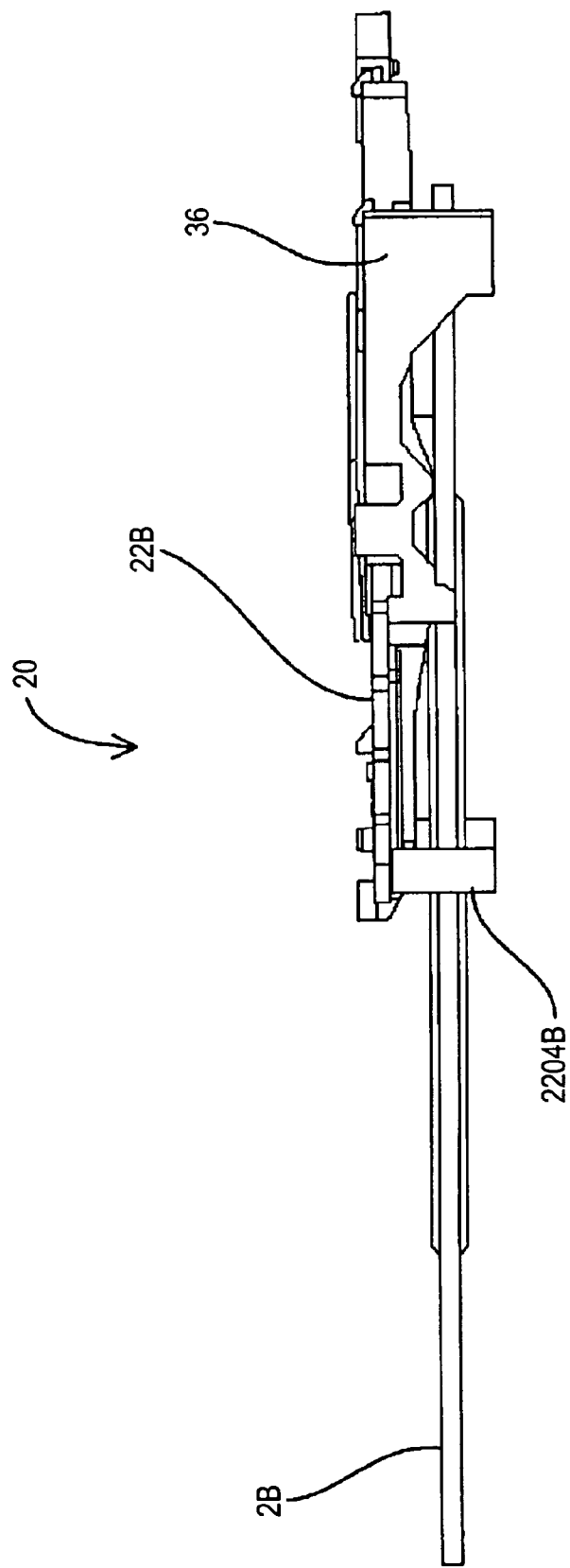
FIG. 13 is a view taken in the direction indicated by the arrow B in FIG. 11.

Next, a description will be made with reference to FIGS. 11 to 13 on operations performed when the second disc-shaped recording medium 2B is inserted into the insertion/ejection port 16 in a position offset toward one side (left side) of the port when viewed in the width direction thereof.

When the second disc-shaped recording medium 2B is inserted into the insertion/ejection port 16 in the position offset to the left side of the port with the first lever 22A and the second lever 22B in their initial positions, only the pin 2204A of the first lever 22A abuts on the outer circumference of the second disc-shaped recording medium 2B.

As a result of the insertion of the second disc-shaped recording medium 2B, the first lever 22A is swung outwardly in the radial direction of the second disc-shaped recording medium 2B.

The pin 2204B of the second lever 22B does not abut on the outer circumference of the second disc-shaped recording medium 2B. Therefore, the insertion of the second disc-shaped recording medium 2B results in no swing of the second lever 22B through the pin 2204, and the second lever 22B is swung through the gear members 24A and 24B.

When it is determined that the angle of rotation of the first lever 22A has reached the second angle of rotation as a result of the detection by the second detection unit 32, the control section 106 controls the disc transport mechanism to cause it to start feeding the second disc-shaped recording medium 2B.

Then, the first lever 22A is swung, and the first gear member 24A is thereby rotated.

The second gear member 24B rotates pursuant to the first gear member 24A in the direction opposite to the first gear member.

As shown in FIG. 11, since the second gear member 24B rotates, the second engaging recess 2210B is moved pursuant to the second engaging protrusion 2410B, and the second lever 22B is therefore swung.

However, when the second gear member 24B rotates further, the second engaging protrusion 2410B is disengaged from the second engaging recess 2210B to ride on the second inclined surface 2212B. Thus, the second gear member 24B is prevented from rotating further, and the swing of the second lever 22B is stopped.

As a result, the rotation of the first gear member 24A is stopped, and the swing of the first lever 22A is also stopped.

Therefore, the angle of swing of the first lever 22A does not reach the first angle of rotation.

That is, it is not determined according to the detection by the first detection unit 30 that the angle of rotation of the first lever 22A has reached the first angle of rotation within the predetermined period after it was determined that the angle of rotation of the first lever 22A reached the second angle of rotation.

Therefore, the control section 106 controls the disc transport mechanism 18 to cause it to stop feeding the second disc-shaped recording medium 2B and to eject the second disc-shaped recording medium 2B from the insertion/ejection port 16.

Figure 15:
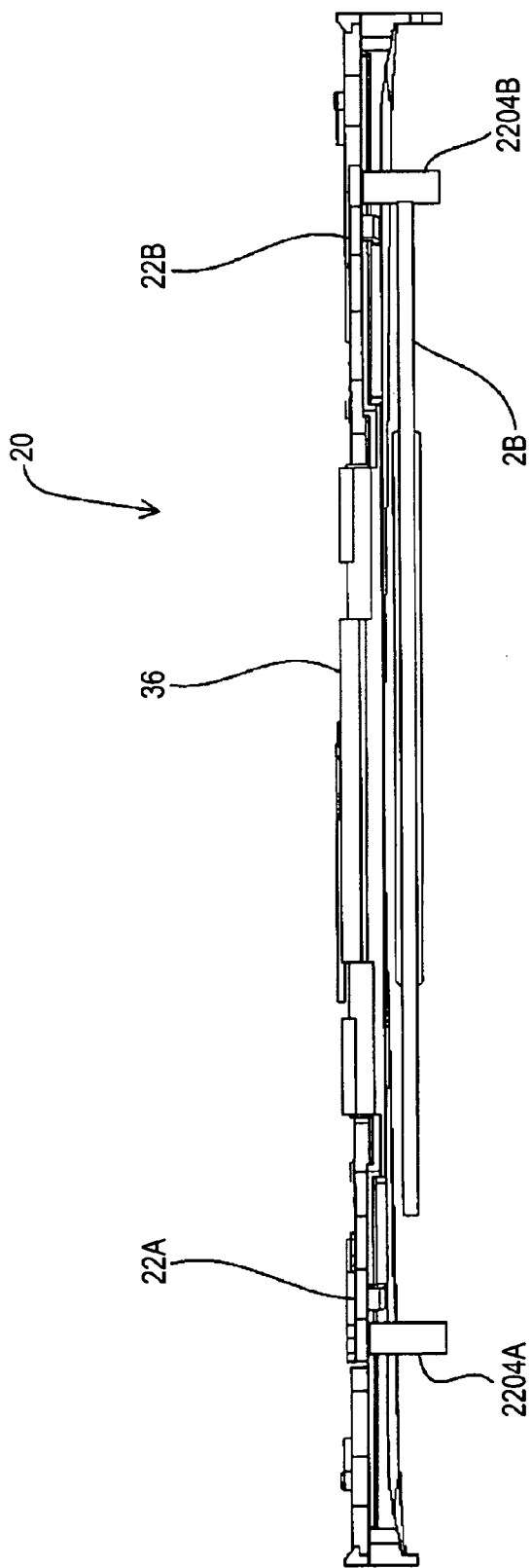
FIG. 15 is a view taken in the direction indicated by the arrow A in FIG. 14.
Figure 16:
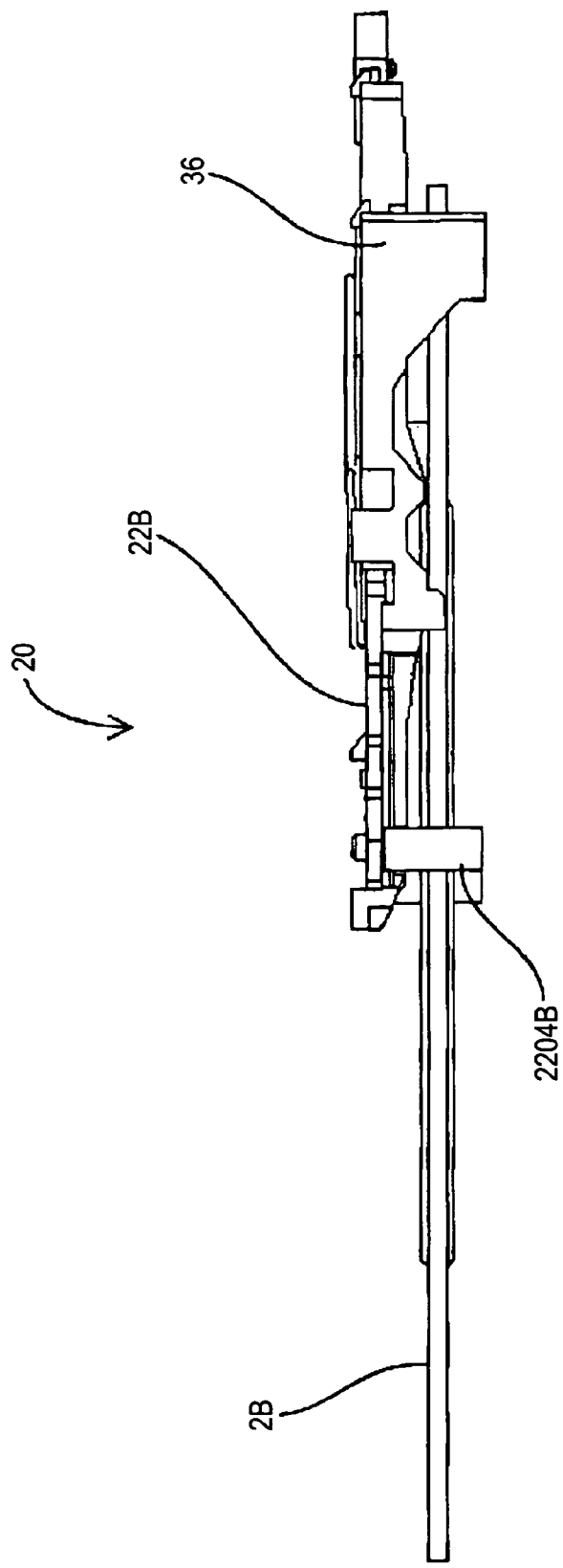
FIG. 16 is a view taken in the direction indicated by the arrow B in FIG. 14.

Next, a description will be made with reference to FIGS. 14 to 16 on operations performed when the second disc-shaped recording medium 2B is inserted into the insertion/ejection port 16 in a position offset toward the other side (right side) of the port when viewed in the width direction thereof.

When the second disc-shaped recording medium 2B is inserted into the insertion/ejection port 16 in the position offset to the right side of the port with the first lever 22A and the second lever 22B in their initial positions, only the pin 2204B of the second lever 22B abuts the outer circumference of the second disc-shaped recording medium 2B.

As a result of the insertion of the second disc-shaped recording medium 2B, the second lever 22B is swung outwardly in the radial direction of the second disc-shaped recording medium 2B.

The pin 2204A of the first lever 22A does not abut on the outer circumference of the second disc-shaped recording medium 2B. Therefore, the insertion of the second disc-shaped recording medium 2B results in no swing of the second lever 22A through the pin 2204A, and the first lever 22A is swung through the gear members 24A and 24B.

When it is determined that the angle of rotation of the first lever 22A has reached the second angle of rotation as a result of the detection by the second detection unit 32, the control section 106 controls the disc transport mechanism to cause it to start feeding the second disc-shaped recording medium 2B.

Then, the second lever 22B is swung, and the second gear member 24B is thereby rotated.

The first gear member 24A rotates pursuant to the second gear member 24B in the direction opposite to the first gear member.

As shown in FIG. 14, since the first gear member 24A rotates, the first engaging recess 2210A is moved pursuant to the first engaging protrusion 2410A, and the first lever 22A is therefore swung.

However, when the first gear member 24A rotates further, the first engaging protrusion 2410A is disengaged from the first engaging recess 2210A to ride on the first inclined surface 2212A. Thus, the first gear member 24A is prevented from rotating further, and the swing of the first lever 22A is stopped.

The rotation of the second gear member 24B is stopped, and the swing of the second lever 22B is also stopped.

Therefore, the swing angle of the first lever 22A does not reach the first angle of rotation.

That is, it is not determined according to the detection by the first detection unit 30 that the angle of rotation of the first lever 22A has reached the first angle of rotation within the predetermined period after it was determined that the angle of rotation of the first lever 22A reached the second angle of rotation.

Therefore, the control section 106 controls the disc transport mechanism 18 to cause it stop feeding the second disc-shaped recording medium 2B and to eject the second disc-shaped recording medium 2B from the insertion/ejection port 16.

In the present embodiment, the angle of rotation of one of the lever is detected to identify a disc-shaped recording medium 2, i.e., to identify the medium as a medium as a first disc-shaped recording medium 2A having a first diameter or a second disc-shaped recording medium 2B having a diameter smaller than the first diameter.

A second disc-shaped recoding medium 2B is ejected from the insertion/ejection port 16 by the disc transport mechanism 18.

When compared to configurations in the related art in which a stopper is projected and retracted into and from a transport path of a disc-shaped recording medium, the embodiment allows the insertion of a second disc-shaped recording medium 2B having a diameter smaller than the first diameter to be more reliably prevented while preventing damage to the disc-shaped recording medium and a failure of the disc apparatus.

In the present embodiment, the identification mechanism 18 is configured using the pair of levers 22, the pair of gear members 24, and the first detection unit 30.

In the configuration, the those members can be disposed side by side on a plane parallel to a disc-shaped recording medium 2 inserted through the insertion/ejection port 16 such that they do not overlap each other.

Thus, the identification mechanism 20 can be provided with a small thickness, which advantageously allows the thickness of the disc apparatus 10 to be kept small.

In case the levers 22 overlap each other in the thickness direction of the apparatus, one of the levers may be deformed in the thickness direction, the problem of interference to the swinging operation of the other lever may consequently occur. In the present embodiment is advantageous in that such a problem can be avoided because the pair of levers 22 is disposed such that they will not overlap each other.

When the second detection unit 32 is provided, the following advantage can be further achieved.

A disc-shaped recording medium 2 manually inserted into the insertion/ejection port 16 is once taken into the housing 12 by the disc transport mechanism 18 regardless of the diameter of the disc-shaped recording medium 2 determined by the identification unit 20.

A second disc-shaped recording medium 2B having a diameter smaller than the first diameter is automatically ejected from the insertion/ejection port 16 based on automatic determination made in the housing 12 rather than determination made by the user.

That is, the provision of the detection unit is advantageous in reliably preventing the insertion of a disc-shaped recording medium 2B having a diameter smaller than the first diameter.

Therefore, it is not necessary to determine the size of a disc-shaped recording medium 2 from a feel that a user's hand has when a stopper is projected and retracted into and out of the transport path of the disc-shaped recording medium, which is advantageous in preventing damage to the disc-shaped recording medium and a failure of the disc apparatus.

Although the disc apparatus 10 of the embodiment has been described as a CD player, the invention may be applied to a wide range of disc apparatus for recording and/or reproducing information in and/or from disc-shaped recording media 2.

The embodiment has been described as an instance in which the first disc-shaped recording medium 2A is a disc-shaped recording medium having a diameter of 12 cm and the second disc-shaped recording medium 2B is a disc-shaped recoding medium having a diameter of 8 cm. However, the invention is not limited to disc-shaped recoding media having such diameters, and the invention may be used in a wide variety of situations involving insertion and removal of two types of disc-shaped recording media having different diameters.

It should be understood by those skilled in the art that various modifications, combinations, sub-combinations and alterations may occur depending on design requirements and other factors insofar as they are within the scope of the appended claims or the equivalents thereof.

What is claimed is:

1. A disc apparatus comprising:
   a housing;
   a recording/reproducing unit provided in the housing to record and/or reproduce information in and/or from a disc-shaped recording medium;
   an insertion/ejection port provided on the housing through which the disc-shaped recording medium is inserted and ejected, the insertion/ejection port having a width greater than the diameter of the disc-shaped recording medium;
   a disc transport mechanism provided in the housing to transport the disc-shaped recording medium between the insertion/ejection port and the recording/reproducing unit; and
   an identification mechanism to identify the disc-shaped recording medium as a first disc-shaped recording medium having a first diameter or a second disc-shaped recording medium having a diameter smaller than the first diameter, wherein
   the identification mechanism includes:
   a pair of levers provided inside the housing and on both sides of the insertion/ejection port in the width direction thereof, the levers swinging at a first swing angle outwardly in the radial direction of the first disc-shaped recording medium from initial positions in which they abut on an outer circumference of the first disc-shaped recording medium when the first recording medium is inserted, the levers being each formed with a lever-side engaging part,
   a pair of gear members rotatably supported between the pair of levers and each formed with a gear-member-side engaging part engageable with respective one of the lever-side engaging parts to engage the levers and the gear members with each other,
   urging means for urging the pair of levers toward the initial positions,
   a stopper abutting on the pair of levers to determine the initial positions,
   first detection means for detecting when the angle of rotation of one of the pair of levers has reached a first angle of rotation, and
   control means for controlling the disc transport mechanism based on the detecting operation of the first detection means;
   the lever-side engaging parts and the gear-member-side engaging parts are engaged with each other in the initial positions and configured such that the gear members are rotated as a result of the swing of the levers and such that the gear-member-side engaging parts and the lever-side engaging parts are disengaged as a result of the rotation of the gear members to stop the rotation of the gear members and the swing of the levers; and
   the control means causes the disc transport mechanism to transport the disc-shaped recording medium to the recording/reproducing unit when it is determined by the first detection means that the angle of rotation of the one of the levers has reached the first angle and causes the disc transport mechanism to eject the disc-shaped recording medium from the insertion/ejection port when it is determined by the first detection means that the angle of rotation of the one of the levers does not reach the first angle.

2. The disc apparatus according to claim 1, further comprising:
   second detection means for detecting when the angle of rotation of one of the pair of levers has reached a second angle smaller than the first angle, wherein
   the control means causes the disc transport mechanism to start transporting the disc-shaped recording medium when it is determined by the second detection means that the angle of rotation of the one of the levers has reached the second angle; and
   the control means causes the disc transport mechanism to eject the disc-shaped recording medium from the insertion/ejection port when the detection by the first detection means does not take place within a predetermined period after the detection by the second detection means.

3. The disc apparatus according to claim 1, wherein
   the gear-member-side engaging part is an engaging protrusion; and
   the lever-side engaging part includes an engaging recess engageable with the engaging protrusion and an inclined surface which is contiguous with the engaging recess and on which the engaging protrusion rides to be urged in the direction of increasing the distance between the center of swing of the lever and the center of rotation of the gear member.

4. The disc apparatus according to claim 1, wherein the pair of levers is disposed in position symmetric about an imaginary line extending through the widthwise center of the insertion/ejection port and extending in the direction in which the disc-shaped recording medium is inserted and ejected; and
the pair of gear members is disposed in positions symmetric about the imaginary line.

5. The disc apparatus according to claim 1, wherein the disc transport mechanism performs linear transportation for linearly moving the disc-shaped recording medium away from or toward the insertion/ejection port and upward/downward transportation for moving the disc-shaped recording medium up and down above the recording/reproducing unit;
a support plate is disposed near the insertion/ejection port in a position above the disc-shaped recording medium inserted through the insertion/ejection port, the plate extending parallel to the direction in which the disc-shaped recording medium is linearly transported; and
the pair of levers and the pair of gear members are supported by the support plate.

6. A disc apparatus comprising:
a housing;
a recording/reproducing unit provided in the housing for recording and/or reproducing information in and/or from a disc-shaped recording medium;
an insertion/ejection port provided on the housing through which the disc-shaped recording medium is inserted and ejected, the insertion/ejection port having a width greater than the diameter of the disc-shaped recording medium;
a disc transport mechanism provided in the housing to transport the disc-shaped recording medium between the insertion/ejection port and the recording/reproducing unit; and
an identification mechanism to identify the disc-shaped recording medium as a first disc-shaped recording medium having a first diameter or a second disc-shaped recording medium having a diameter smaller than the first diameter, wherein the identification mechanism includes:
a pair of levers provided inside the housing and on both sides of the insertion/ejection port in the width direction thereof, the levers swinging at a first swing angle outwardly in the radial direction of the first disc-shaped recording medium from initial positions in which they abut on an outer circumference of the first disc-shaped recording medium when the first recording medium is inserted, the levers being each formed with a lever-side engaging part,
a pair of gear members rotatably supported between the pair of levers and each formed with a gear-member-side engaging part engageable with respective one of the lever-side engaging parts to engage the levers and the gear members with each other,
an urging unit configured to urge the pair of levers toward the initial positions,
a stopper abutting on the pair of levers to determine the initial positions,
a first detection unit configured to detect when the angle of rotation of one of the pair of levers has reached a first angle of rotation, and
a control unit configured to control the disc transport mechanism based on the detecting operation of the first detection unit;
the lever-side engaging parts and the gear-member-side engaging parts are engaged with each other in the initial positions and configured such that the gear members are rotated as a result of the swing of the levers and such that the gear-member-side engaging parts and the lever-side engaging parts are disengaged as a result of the rotation of the gear members to stop the rotation of the gear members and the swing of the levers; and
the control unit causes the disc transport mechanism to transport the disc-shaped recording medium to the recording/reproducing unit when it is determined by the first detection unit that the angle of rotation of the one of the levers has reached the first angle and causes the disc transport mechanism to eject the disc-shaped recording medium from the insertion/ejection port when it is determined by the first detection unit that the angle of rotation of the one of the levers does not reach the first angle.

* * * * *